G. I. BERGEN.
Corn-Planter.
No. 40,789. Patented Dec 1, 1863.
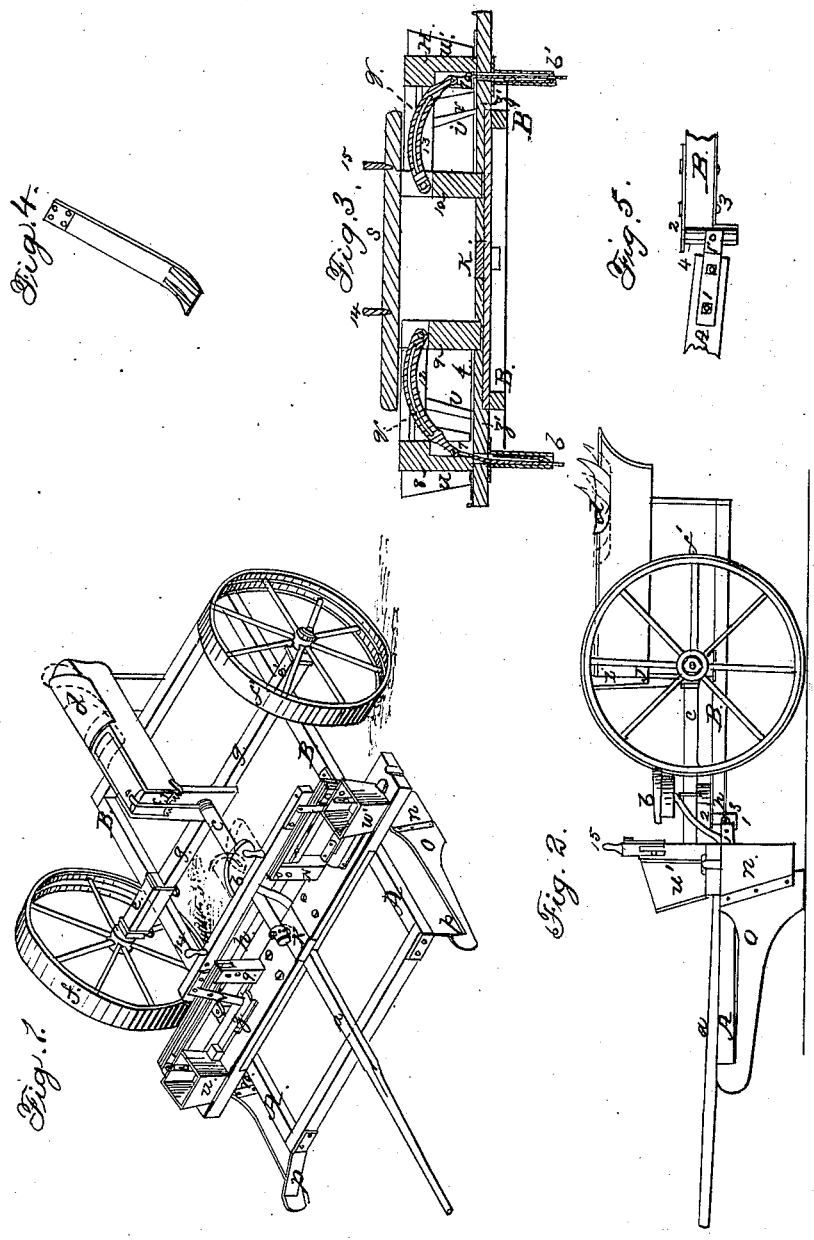

UNITED STATES PATENT OFFICE.

GEORGE I. BERGEN, OF GALESBURG, ILLINOIS.

IMPROVEMENT IN CORN-PLANTERS.

Specification forming part of Letters Patent No. 40,789, dated December 1, 1863.

*To all whom it may concern:*

Be it known that I, GEORGE I. BERGEN, of the town of Galesburg, in the county of Knox and State of Illinois, have invented certain new and useful Improvements in Seed-Planters, of which the following is a full, clear, and exact description, reference being had to the accompanying drawings, which make part of this specification, and in which—

Figure 1 represents my machine in perspective. Fig. 2 presents a longitudinal central elevation of the same; Fig. 3, a central cross elevation of the planting mechanism. Fig. 4 represents, in an enlarged view, the indicating-spring; and Fig. 5, the coupling.

My invention has relation to that class of seeding-machines which requires a driver and dropman to operate them effectively, and which consists of two frames coupled together, the one to carry the seed-planting mechanism and the dropman and the other the driver of the team.

The leading objects of my improvements are to render the frame extremely flexible, so that it will work equally well in rough as in smooth ground; to balance the seed-planter with precision independent of the relation between the weight of the driver and dropman; to establish such a relation between the seats of the driver and dropman that the driver can control the depth of planting by a change of his position; to so seat the dropman that he can change his position at will and better regulate the work of the machine; to give the dropman notice when the seed drops, to avoid skipping in planting; to form the colter so that it must cut without clogging, or ride over rigid obstacles in its path without being stopped by them; to keep the seed-tubes from clogging and plant the seed without bruising or breaking, always longitudinally in the furrows; to place the carrying-wheels of the rear frame so that they shall act as covering-wheels; to force the seed to the ground through any number of planting-tubes by a single movement of the dropman, and to render the width of the machine, or the distance between the planting-tubes, adjustable, that it may be adapted to any desired width of planting; and my invention consists, first, in connecting the front and rear frames by slotted joints that shall admit a sufficient vertical movement to either frame to render the machine flexible enough to permit either tube or wheel to enter a dead furrow or pass over lumps or clods without materially changing the position of the other tube or wheel; second, the balancing of the front and rear frames by means of a windlass attached to both, so as to render the balance accurate, independent of the relative weights of the driver and dropman, and so that by turning the windlass the driver can regulate the depth of planting or elevate the seed-tubes entirely above the ground; third, in combining the dropman's and the driver's seats in such relation to each other that a change of position on the part of the driver will enable him to control the depth of planting; fourth, in placing the dropman on a revolving seat, to give him more perfect command of the machine and to enable him to change his position with facility; fifth, in the employment of a windlass-bar to balance the front and rear frames of a seeding-machine, control the depth of planting, and regulate the weight of the tongue upon the team; sixth, in uniting the windlass to either frame by a spirally-wound chain or its equivalent, to vary the leverage of the driver's seat.

To enable others skilled in the art to make and use my invention, I will proceed to describe its construction and operation.

I construct my seed-planter in two parts, consisting of two frames of equal width and suitable strength coupled together. The front frame, A A, supports the tongue *a*, the seeding mechanism, and the dropman's seat *b*. The rear frame, B B, carries the windlass *c*, the driver's seat *d*, and the adjustable axes *e* and *e'* for the supporting-wheels *f* and *f'*. These frames are coupled together by a slotted joint at each side of the frames, to permit either frame to have a varying vertical movement without changing the position of the seed-tubes or varying the depth of planting. This coupling-joint consists of two jaws, one shown at 1 in Fig. 2, extending back from each side bar, A A, of the front frame, and the jaws are connected by cross-bolts, as at 1', Fig. 2, of sufficient strength to draw the rear frame.

From the upper and lower sides, 2 and 3 of Fig. 2, of the forward ends of the rear frame-pieces, B B, two jaws project a sufficient distance to pass beyond the pins 1' in the jaws of the front frame, and to receive a coupling-bolt, 4, through jaws 2 and 3, the lower one of these jaws, 3, being curved or bent, so as to give the proper play or the required range of motion between the frames, and to permit the wheels, or either one of them, to pass over rough ground without lifting or depressing the front frame.

The windlass-bar $e$ is secured to the rear frame by straps or sockets fastened to the axle-bar $g$ and cross-bar $h$, but so loosely as to leave it free to turn in the straps or sockets. The rear end of the windlass-bar has a handled lever, $i$, that rises from it perpendicularly in front of the driver's seat and within his reach. This lever-handle has a sufficient curve to give it a tendency to spring toward the front of the driver's seat and into the teeth of a ratchet-bar, $j$, secured thereto, which keeps it at any desired position. The front end of the windlass-bar $c$ passes directly over the cross-plank $k$ of the front frame, and is fastened thereto by a chain, $l$, one end of the chain being fastened to the cross-plank, and the other end, winding spirally on the bar $c$, is fastened thereto by a bolt or pin situated some distance back of the fastening to the cross-plank. The chain is so attached to the bar and frame as nearly to balance the weight of the front frame and dropman with the tongue, so as to carry the weight of the front frame and tongue off the neck of the team. It will thus be readily perceived that by turning the windlass-bar so as to wind up the chain the leverage of the windlass lengthens, so as to require a heavier driver or the driver to move farther back on his seat to raise the planter-frame. It is obvious that the driver's weight alone may be made to balance the dropman, front frame, and tongue by winding the chain tight upon the windlass, for this renders the connection between the front and rear frame rigid. Again, after the windlass is set to balance the weight of any driver, dropman, and the machine, it is obvious that to plant deeper the windlass must be turned farther in the same direction, and to plant less deep it must be turned in the opposite direction. When at the end of a row the dropman leaves his seat, and the front frame, now relieved of his weight, rises from the ground from being overbalanced by the weight of the driver exerted through the leverage of the windlass-bar, the front frame only rises as far as permitted by the coupling-joint, so that the driver is not incommoded in turning the machine to plant the new rows. Of course the operation is the same in going to and from the field. The relation between the rotating seat of the dropman and the sliding seat of the driver, as here combined and arranged, enables the driver, through the operation of the windlass-bar, to govern the depth of planting. He can, of course, alter the depth of planting by changing his position on the driver's seat.

The dropman's seat is supported by a standard, $m$, secured centrally to the bottom of the cross-plank $k$, and is pivoted to the top of the standard, so as to turn freely thereon, and sufficiently elevated to enable the dropman to see the check-rows. It is thus apparent that the arrangement of the dropman's seat in this manner enables him to turn to either side with ease to watch the operation of the machine, and to leave his seat on either hand with equal convenience.

As a means of securing more accurate planting, I desire to give the dropman positive notice when the retaining-spring has delivered its seed, and this I effect by employing an indicating-spring, that the dropman may hear the seed as they fall upon it from the hopper. The tubes $n$ may be made of any sheet metal of suitable strength, or they may be cast solid, and with a flange at their upper edge, by which they can be securely bolted to the bottom of cross-plank $k$. They may be made about one foot in length, and have an internal opening of about one and a quarter inch wide by about four inches or more in length. The edges of these tubes next the colter are so formed as to retain the colter in place and directly in front of the plunger. To one of the sides of these tubes I attach a thin steel plate spring about four inches wide and about ten inches in length. The bottom of each spring is curved, as shown in Fig. 4, and this curve is sustained by two thin ribs that are made straight on their upper surfaces to be smoothly acted upon by the plungers 6 7'. As the plunger descends it strikes the plane surfaces of the ribs and pushes the spring to the opposite side of the tube. The seed, which had lain between the ribs on the spring, are thus discharged from the tube in advance of the plunger, and are pressed down on the ground in a straight direction with the furrow, and so as to cover about four inches of its surface. As the plunger is withdrawn the spring resumes its normal position, and the plunger, rising gradually upon the ribs, prevents it from striking a blow against the side of the tube, while the dropping of the seed from the hopper upon the spring can be distinctly heard by the dropman, and he is thus enabled to determine by his ear when the planting mechanism is doing its duty properly.

To open the furrow I employ a colter of novel construction. A piece of sheet-steel, having been cut or forged to a concave edge on its under side, is securely attached to the front edge of the seed-tube, and is made to project forward with a gradual taper to a distance a little in advance of and about opposite to the front of the frame, to which it is fastened by a suitable brace, $p$. The colters on each side of the frame must be parallel to each other and situated directly in line and in front of the plungers of the seed-tubes, and they must project below the seed-tubes as far as necessary to let the plungers pass slightly beyond the mouth of the seed-tubes. The front end of the colter is placed high enough above the ground to pass clear of ordinary obstructions, and it will thus be perceived that from its peculiar curvature and support it must easily pass over or cut through all the objects or any obstructions that are in its path.

For the double purpose of insuring the delivery of the seed to and in line with the furrow and prevent all possibility of clogging the tubes, I employ plungers within the seed-tubes and operate them by the hand of the dropman through a mechanism that shall depress and raise both plungers simultaneously, and at the same time close the hopper against the delivery of any seed while the plungers are on their downward motion. In tubes of the size before described the plunger should be about four inches wide and about three-eighths of inch thick to move with ease within the tubes and on the side opposite the indicating-spring. A spring-rod connects the plunger with the slotted working-beam $q$ by a hinged joint; or a coupling-strap, 7, may form this connection.

The cross-plank $k$ of the front frame carries on each side of the tongue an adjustable sliding plank, $z$ and $z'$, which supports the seeding mechanism, consisting of the hoppers $u$ $u'$, the sustaining-posts 8, 9, 10, and 11, the slotted working-beams $q$ $q'$, the slide-beam S, the guide-plates 12 and 13, and the seed-distributers $t$ and $t'$, with their moving fingers $v$ and $v'$. Holes through the plank $z$ and $z'$ permit the escape of the seed from the hoppers when the openings in the distributers are brought opposite the openings into the seed-tubes. The slide-beam S, having handles 14 and 15, moves easily on top of posts 9 and 10, and is vibrated by the dropman to move the plungers and distributers.

On each side of the beam S, and near each end, are plates $v$ and $v'$, secured by bolts passing through holes in the beam. By increasing the number of holes in the beam these plates can be adjusted as desired. The plates $v$ and $v'$ extend down outside of the beam S, and a bolt passes through them transversely between the guide-bars 12 and 13; and through the slot of the working-beams $q$ and $q'$ the plates $v$ and $v'$ in front of the beam S pass down in the form of a finger to move longitudinally in the recesses in the seed-distributers. The inner ends of the working-beams $q$ and $q'$ are confined between the guide-bars by pins, on which they vibrate, while at the other end they are, as before described, attached to rods, that move the plungers 6 and 6'. The movement of the slide-beam S through the fingers $v$ and $v'$ moves the distributers so as to let the quantity of seed pass into the tubes that is to be planted at each vibration of the beam S. After passing the distributers, the seed enters the tubes and rests on the indicating-springs between the ribs, which retain the seed until the reverse movement of slide-beam S causes the working-beams to push the plungers quickly down on the ribs of the spring, throws it back to the opposite side of the tube, and drops the seed upon the ground lengthwise in the furrow, where they are lightly pressed by the plungers, which have now passed the lower ends of the seed-tubes and removed all matters that might tend to clog them. The distributers remain unmoved to prevent the passing of any more seed into the tubes while the plungers are raised, and the further movement of the beam S by the dropman raises the plunger quickly and places the distributers in position again to pass the quantity of seed desired and permit the indicating-spring to return quickly against the sides of the tubes and receive and retain the seed until the next descent of the plungers.

The distributers pass under a bridge or cut-off in the bottom of the hoppers, that permits but a limited quantity of seed to pass into a hole in the distributer. The lower side of the bridge may be lined with rubber or other flexible material, to strike back all the seed save that required to just fill the holes in the distributers, which vibrate in the hoppers, so as to bring one hole at each move under each bridge and drop the seed it contains on the retaining-spring. Thus it will be perceived that all these results are effected by a single movement of the slide-bar S by the dropman.

In the most approved seed-planters it is found best to employ covering-wheels; and I have so placed my carrying-wheels for the rear frame that they shall perform the function of covering-wheels whatever change in the width of planting may be adopted; and this I effect by placing the carrying-wheels of the rear frame so that they shall always travel upon the center of the furrow made by the colter by using adjustable axles $e$ and $e'$ on the axle-bar of the rear frame; and it is obvious that this arrangement dispenses with the necessity of using auxiliary or independent covering-wheels in all planters for planting but two rows at a time.

It is obvious that, to apply my improvements to a seed-planter that shall plant many rows at a time, it is only necessary to augment the number of the colters, hoppers, distributers, seed-tubes, and plungers and add the requisite independent covering-rollers to make it effective as a drill-machine for sowing small grain, for a single movement of the beam S by the dropman will simultaneously move a large number of distributers and plungers, so as to close the hopper of each tube and deposit the seed from all the tubes used, with nearly equal facility as in the two-row machine.

To render my planter capable of planting rows of various widths, I have so constructed it as to move the colters and seed-tubes of the front frame and the carrying-wheels of the rear frame nearer to each other or farther apart. To the ends of the axle-bar $g$ of the rear frame I attach, by straps or any suitable fastening, the axles $e$ and $e'$; and it will readily be perceived that by loosening the straps or fastenings the axles may be brought nearer together or placed farther apart, and again fastened at the width required. To contract the width between the planting-tubes, the front colter-braces must be moved nearer together and fastened in the new position at the width desired, and the planks $z$ and $z'$ must be removed and reduced in length, so as to correspond with the width between the colters, These changes, with the required change of position for the fingers $v$ and $v'$, will be all that will be necessary to adjust the width of the two frames to plant at a different width from that shown in the drawings, and render the machine capable of being used with equal effect at any desired width.

The rear frame carries a driver's seat capable of being shifted forward and back at pleasure to change the balance of the machine by shifting the weight of the driver from one point to another. This seat may be placed on a box supported on the frame, as shown in the drawings, and the box may be rendered useful as a tool-chest or for other purposes.

What I claim as my invention, and desire to secure by Letters Patent of the United States, is—

1. The combination, in a seed-planter, of a front frame carrying the seeding mechanism and a dropman's seat, and a rear frame carrying a coupling-windlass and a driver's seat, with the slotted coupling, substantially as described, for the purposes set forth.

2. Balancing the front and rear frames of a seed-planter by a windlass, substantially in the manner and for the purposes set forth.

3. The windlass C, to balance the front and rear frames or control the depth of planting in a seeding-machine, or to regulate the weight of the tongue upon the team, as set forth.

4. The combination of the chain fastened to either frame with the windlass, and running spirally around it, to vary the leverage, substantially as described and set forth.

5. The revolving seat for the dropman, combined with a seed-planter, constructed and operating as and for the purpose described.

6. The combination of the dropman's seat with the driver's seat and with the windlass, substantially as described, and for the purposes set forth.

7. The indicating-spring with its ribs, constructed and operating substantially as described.

8. The slotted joint connecting the front and rear frames, when the draft of the rear frame is effected alone by this coupling, and so as to allow a vertical movement of the front or rear frame, as and for the purpose set forth.

In testimony whereof I have hereunto subscribed my name.

GEO. I. BERGEN.

Witnesses:
   J. EVANT,
   F. P. SISSON.